(12) United States Patent
Hagihara

(10) Patent No.: US 6,871,804 B2
(45) Date of Patent: Mar. 29, 2005

(54) DISCONNECTABLE NOZZLE FOR HOT AIR

(75) Inventor: Yoshihiro Hagihara, Tondabayashi (JP)

(73) Assignee: Hakko Corporation, Osaka (JP)

( * ) Notice: Subject to any disclaimer, the term of this patent is extended or adjusted under 35 U.S.C. 154(b) by 119 days.

(21) Appl. No.: 10/432,200

(22) PCT Filed: May 8, 2002

(86) PCT No.: PCT/JP02/04472

§ 371 (c)(1),
(2), (4) Date: May 20, 2003

(87) PCT Pub. No.: WO02/098195

PCT Pub. Date: Dec. 5, 2002

(65) Prior Publication Data

US 2004/0028395 A1 Feb. 12, 2004

(30) Foreign Application Priority Data

May 25, 2001 (JP) ........................................ 2001-157556

(51) Int. Cl.[7] .............................. B05B 1/00; B05B 1/14
(52) U.S. Cl. ...................... 239/600; 239/600; 239/568; 285/90; 285/91; 285/361; 285/396; 285/402
(58) Field of Search ................................ 239/600, 589; 222/567; 248/73, 80–83; 285/197, 145.4, 91, 361, 396, 402; 203/229

(56) References Cited

U.S. PATENT DOCUMENTS

| | | | | | |
|---|---|---|---|---|---|
| 1,080,674 | A | * | 12/1913 | Berg | ............................ 285/91 |
| 1,128,634 | A | * | 2/1915 | Talbot | ........................... 285/91 |
| 1,823,234 | A | * | 9/1931 | Bell | .............................. 285/90 |
| 2,230,098 | A | * | 1/1941 | Wurzburger | .................. 285/90 |
| 3,848,950 | A | * | 11/1974 | McCormick et al. | ........ 439/311 |
| 5,253,716 | A | * | 10/1993 | Mitchell | ........................ 169/70 |
| 6,085,998 | A | * | 7/2000 | Yokoyama | ................... 239/600 |

FOREIGN PATENT DOCUMENTS

JP    2002118358    4/2002

* cited by examiner

Primary Examiner—David A. Scherbel
Assistant Examiner—James S Hogan
(74) Attorney, Agent, or Firm—Squire, Sanders & Dempsey L.L.P.

(57) ABSTRACT

A disconnectable hot air nozzle device is provided with a nozzle holder 2 having an introducing portion 2c and a hook shaped retaining portion 2d, an attachment 3, and a cover 4 vertically replaceable for a predetermined amount relative to the attachment and having a retaining pin 4a, with the retaining pin being introduced from the introducing portion 2c of the nozzle holder 3 into a retaining portion 2d. The nozzle holder 2 and the attachment 3 are disconnectably fixed with each other, with the abutting surfaces provided on the nozzle holder 2 and the attachment 3 being brought into abutment with each other by a force applied from a urging member 5 to the nozzle holder 2 via the retaining pin 4a.

3 Claims, 4 Drawing Sheets

DISCONNECTABLE NOZZLE FOR HOT AIR

FIELD OF ART

The present invention relates to a disconnectable nozzle for hot air which is adapted for hot air blowing type heating device to be used for dismounting various surface mounted electric parts.

BACKGROUND OF THE INVENTION

Generally, a disconnectable hot air nozzle adapted for a hot air blowing type heating device is provided with a nozzle holder for holding a nozzle for blowing hot air, and a pipe fixing means for connecting the nozzle holder and air pipe, with the pipe fixing means fixing the nozzle holder to the air pipe.

A method for fixing the nozzle holder to the air pipe, is generally employed wherein, for example as shown in FIG. 4, a clamp 8 for the coupling with the air pipe, is provided at a base portion of the nozzle holder 2 integrally therewith, the nozzle holder 2 is fitted on the air pipe 7, and then the screw 9 of the clamp 8 is fastened. Another method is also generally employed wherein a screw is provided on a side surface of the nozzle holder 2 and the screw is fastened to fix the nozzle holder 2 to the air pipe 7. Still another method is also employed wherein a male screw and female screw are respectively formed on the opposing surfaces of the air pipe 7 and the nozzle holder 2 such that the male and female screws are threaded with each other to fasten the nozzle holder 2 to the air pipe 7.

However, such conventional methods for fixing the nozzle holder to the air pipe with the screw coupling or fastening of the screw, has a problem that the method requires the operator to operate with both hands and that it takes much time and trouble for the exchange of the nozzle, resulting in inefficiency of operation.

In addition, according to the above mentioned conventional method, the direction of the nozzle holder relative to the air pipe is not determined definitely and it is difficult to determine the position of the nozzle holder. Accordingly, in case of changing the direction of the nozzle holder, after the screw coupling or the screw fastening is loosed and the nozzle holder is turned, further delicate adjustment is required. Thus, a problem that the efficiency of operation is low, exists in the case where the direction of the nozzle is to be changed.

The present invention has been made in view of such circumstances, and is contemplated to provide a disconnectable hot air nozzle that improve operational efficiency in both nozzle exchange and changing of the direction of the nozzle.

DISCLOSURE OF THE INVENTION

To solve the above mentioned problem, the present invention is directed to a disconnectable hot air nozzle adapted for hot air blowing type heating device to be used for removal of a surface mounted electric part, and adapted for being connected with hot air pipe, the hot air nozzle including: a nozzle holder for holding a nozzle which is for blowing hot air; a cylindrical attachment to be connected with the air pipe at its upper end portion; a cylindrical cover provided to surround the attachment and connected to the attachment such that the cylindrical cover can not rotate relative to the attachment but can move vertically for a predetermined amount relative to the attachment; and a urging member provided between the attachment and the cover to urge the cover upward relative to the attachment; wherein the hot air nozzle is characterized by that said cover is provided with a retaining pin which projects radially ; that said nozzle holder has a cylindrical portion fittable to the lower part of the attachment, the cylindrical portion being provided with an introducing portion for introducing the retaining pin of the cover, and a hook shaped retaining portion for retaining the retaining pin; that said attachment and nozzle holder are respectively provided with abutting portions vertically opposing each other; that when said cylindrical portion of the nozzle holder is fitted to the lower portion of the attachment and said retaining pin is introduced by the introducing portion of the nozzle holder and retained at the retaining portion, the nozzle holder is disconnectably fixed to the attachment with said abutting portions being brought into resilient abutment with each other by the force applied from the urging member to the nozzle holder via the retaining pin.

According to the present invention, a nozzle holder is disconnectably fixed to an attachment only by fitting the nozzle holder to the attachment and at the same time, making a retaining pin match a introducing portion of the nozzle holder, and then turning the nozzle holder a little relative to the attachment, thereby enabling one-touch connection and disconnection of the nozzle, resulting in much improvement in operational efficiency of nozzle exchange.

As an example of a structure for coupling the cover to the attachment with the cover being un-rotatable relative to the attachment but the cover being movable up and down for a certain amount, an elongated slot may be formed on the cover and a retaining pin may be engaged in the slot. Further, it is preferable that retaining pins are provided at a plurality of locations with a predetermined pitch or interval, circumferentially of the cover and that introducing portions and retaining portions are provided at a plurality of locations corresponding to the location of the retaining pins. With that structure, the rotational direction of the nozzle holder is definitely determined in accordance with the position of the retaining pin and the direction of the nozzle is accurately changed by one-touch operation by changing the combination of the retaining portion of the nozzle holder and the retaining pin, resulting in much improvement of the operational efficiency in changing the direction of the nozzle.

BEST MODE TO EMBODY THE INVENTION

A preferred embodiment of the present invention will be described hereinafter in detail with reference to the accompanying drawings.

Figure 1:
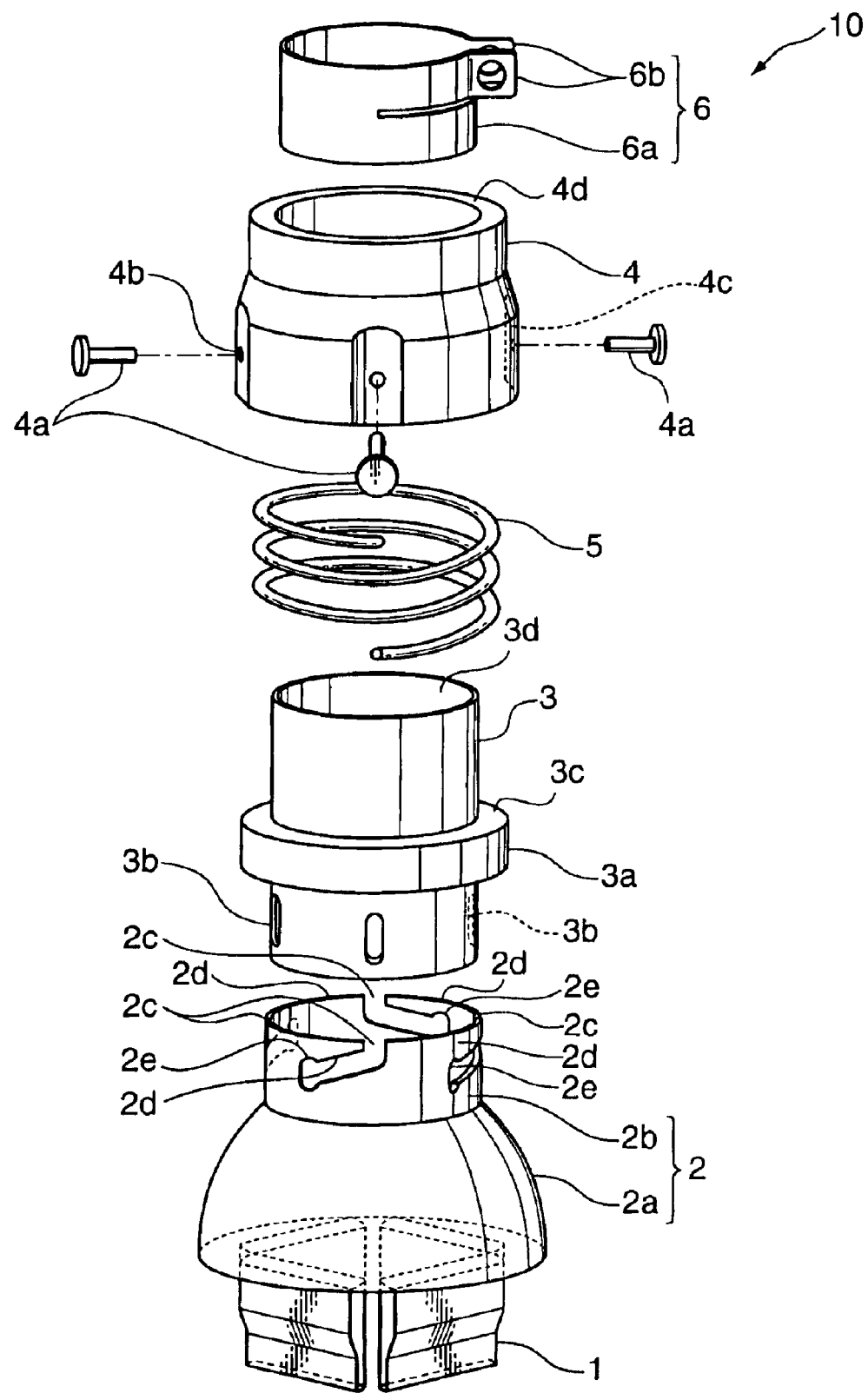
FIG. 1 is an exploded perspective view showing a general structure of a disconnectable hot-air nozzle according to an embodiment of the present invention.
Figure 2:
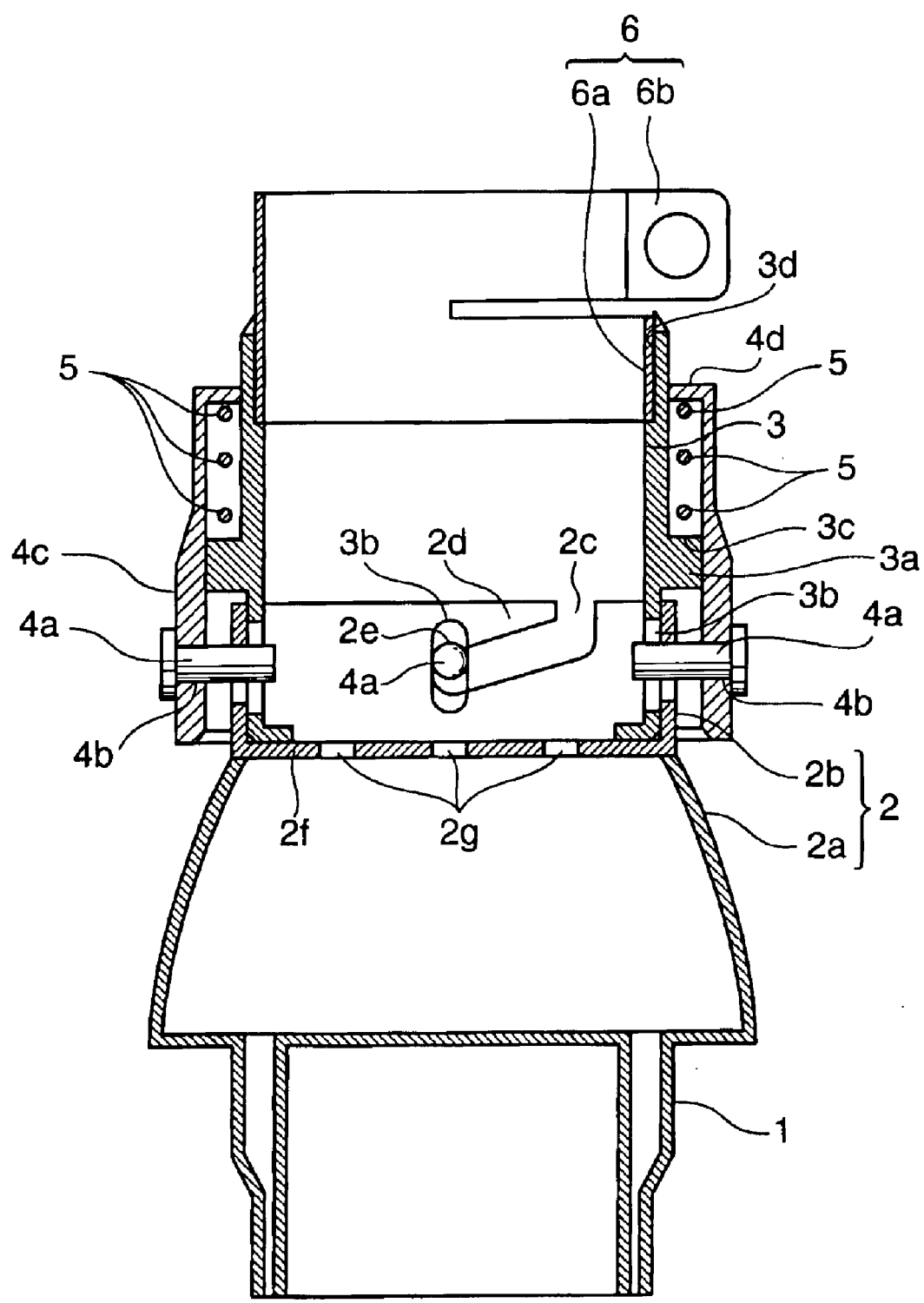
FIG. 2 is a sectional view showing a general structure of the disconnectable hot-air nozzle according to the embodiment of the present invention.

FIG. 1 is an exploded perspective view showing a general structure of a disconnectable hot-air nozzle according to an embodiment of the present invention. FIG. 2 is a sectional view showing a general structure of the disconnectable hot-air nozzle according to the embodiment of the present invention.

Referring to those Figures, a disconnectable hot-air nozzle 10 according to the present embodiment is provided with an attachment 3, cover 4, an urging member 5 and a nozzle holder 2 for holding nozzles 1 which in turn are for blowing hot air.

It is to be noted that FIG. 2 shows a state of retaining of the nozzle holder 2 to the attachment 3 as will be described later in the explanation of the operation.

The above mentioned nozzles 1 are for blowing, from their ends, hot air to the periphery of surface mounted electric parts to heat and melt the molten metal adapted for mounting the surface mounted electric parts, and the nozzles are arranged at four sides to surround the periphery of the surface mounted electric part, with each nozzle 1 being formed in a flat cylindrical shape.

The nozzles 1 are also tapered from their respective base towards ends to be narrower towards the ends such that the nozzles 1 may heats small area of the periphery of the surface mounted electric parts.

The above mentioned nozzle holder 2 is substantially cylindrical metal member provided for holding the nozzle 1, and has a nozzle holding portion 2a of a substantially truncated cone shape for making uniform the amount of blown hot air among the nozzles 1 by keeping the air therein for a while, and a cylindrical portion 2b which is to be fitted on the attachment described next. A plate 2f (FIG. 2) having many ventilation holes 2g, is provided within the nozzle holder 2 at the position between the nozzle holding portion 2a and the cylindrical portion 2b.

The attachment 3 mentioned above is a cylindrical metal member provided between the nozzle holder 2 and an air pipe (not shown in the Figure) to connect the nozzle holder and the air pipe each other. The attachment 3 has a flange portion 3a of a flange shape at its central portion such that the flange portion is in sidable contact with the inner surface of the cover 4 which will be describe next. The attachment 3 has also at least one slot 3b in its lower part. An upper part of the attachment 3 is to be connected with a pipe fixing means 6 for fixing the air pipe.

The above mentioned cover 4 is a cylindrical metal member provided to surround the attachment 3, and has retaining pins 4a, and pin holes 4b for fixing the retaining pins 4a. The portions of the cover 4 where the retaining pins 4a and the pin holes 4b are provided, are thicker than other portions of the cover 4, taking into consideration the strength of those portions.

The cover 4 is coupled with the attachment 3 in the state that the cover 4 does not rotate relative to the attachment, but that the cover 4 may move in vertical direction for a predetermined amount. In the present embodiment, the retaining pins 41 engage the slots 3b to retain the cover 4 to the attachment 4, allowing relative movement of the attachment 3 and the cover 4 only in the vertical direction for the predetermined amount.

The above mentioned pin holes 4b are holes for attaching the retaining pins on the cover and having a little bit smaller diameter than the outer diameter of the retaining pins 4a which are to be provided on the side plane of the cover 4, such that the pins are press fitted and fixed in the respective pin holes 4b. The side surface of the cover 4 where the pins 4b are provided, is provided with flat portions 4c adapted for the attachment of the retaining pins 4a.

The cylindrical portion 2b of the above mentioned nozzle holder 2 is provided with introducing portions 2c for introducing the retaining pins 4a of the cover 4, and a retaining portions 2d of a hook shape for retaining the retaining pins 4a introduced by the introducing portions 2c. That is, cuts for forming the introducing parts 2c are provided from the upper end of the cylindrical portion 2b to extend obliquely to its lower portion and the retaining portions 2d are formed by the portions defining the upper portions of the cuts.

In addition, retaining recesses 2e are provided at the base portions of the retaining portions 2d, i.e. at the extreme bottom of the introducing portion 2c, and the retaining pins 4a of the cover 4 are retained by the retaining recesses 2e such that the nozzle holder 2 is retained by the attachment 3.

The above mentioned urging member 5 is an elastic member provided between the attachment 3 and the cover 4 to urge the cover 4 upward relative to the attachment 3, and is composed of a coil spring in the embodiment shown in the Figures. One end of the urging member 5 is in contact with the back surface 3c of the flange portion 3a of the attachment 3 on the air supply side. The other end of the urging member 5 is in contact with the inner surface of the upper portion 4d of the cover which is provided at an end portion of the cover 4 on the air supply side.

The urging member 5 pulls up the nozzle holder 2 retained by the retaining pins 4a, to bring the opposing surfaces of the nozzle holder 2 and the attachment 3 into elastic press contact with each other and disconnectably fix the nozzle holder 2 to the attachment 3. In the present embodiment, the plate 2f of the nozzle holder 2 and the lower end part of the attachment 3 oppose and are in abutment with each other.

The above mentioned pipe fixing means 6 is a cylindrical metal member provided for fixing the air pipe to the end portion of the attachment 3 on the air pipe side, and includes an insertion portion 6a and a clamp 6b.

The above mentioned insertion portion 6a is for being fitted to the attachment 3 and is fitted to the pipe fixing means connecting portion 3d provided on the attachment, and is fixed to the attachment 3, for example, by means of welding.

The above mentioned clamp 6b is for fixing the air pipe to the attachment 3 and is provided on the end portion of the pipe fixing means 6 on the air pipe side. The air pipe is fitted and connected in the pipe fixing means 6 and the attachment 3 and is connected to the attachment 3 by fastening bolt and nut (not-shown) to be inserted to the clamp 6b.

Then, the operation of the present embodiment will be explained with reference to FIG. 3.

Figure 3:
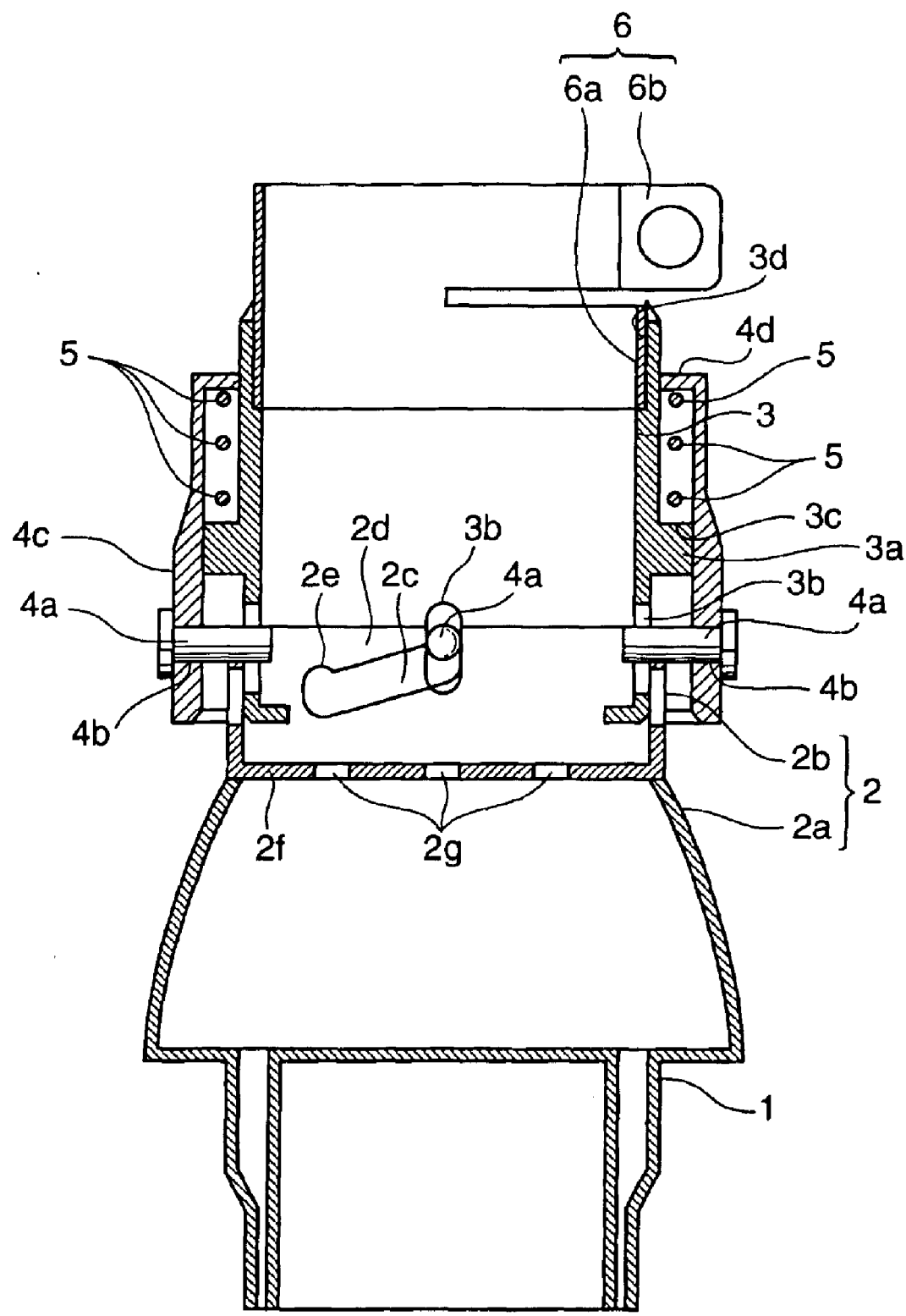
FIG. 3 is a sectional view showing the state of insertion of a nozzle holder.
Figure 4:
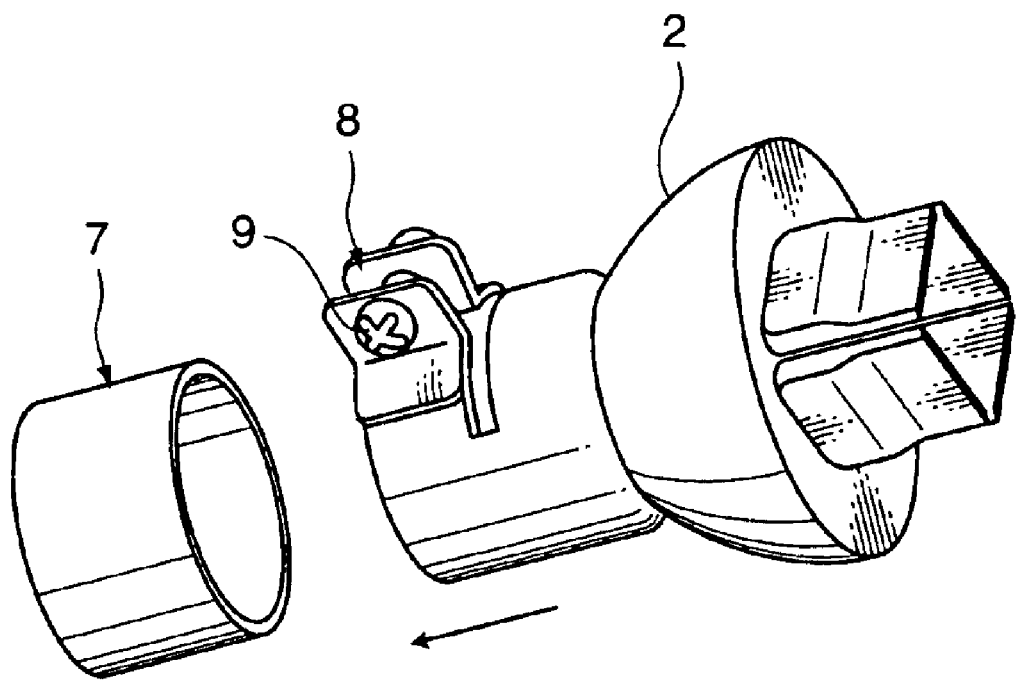
FIG. 4 is a perspective view showing an example of a conventional method for fixing a nozzle holder to an air pipe.

FIG. 3 is a sectional view showing the introduced state of the nozzle holder 2.

In the introduced state shown in FIG. 3, the nozzle holder 2 fits on the attachment 3 at the position where the introducing portions 2c provided on the cylindrical portion 2b of the nozzle holder 2, face the retaining pins 4a of the cover 4.

When the nozzle holder 2 is manipulated to rotate a little relative to the attachment 3 from the state mentioned above, the introducing portion 2c provided on the cylindrical portion 2b of the nozzle holder 2 advances obliquely with the cylindrical portions 2b being in contact with the retaining pins 4a of the cover 4 and shifts to a retaining state where the nozzle holder 2 is retained to the attachment 3.

At that time, the slots 3b and the attachment 3 and the retaining pins 4a of the cover 4 are displaceable relatively in the direction of air flow so that the retaining pins 4a can be introduced from the introducing portions 2c of the nozzle holder 2 to the retaining portions 2d.

In addition, retaining recesses 2e are provided at the base end portion of the retaining portions 2d, i.e. at the extreme bottom of the introducing portions 2c, and the retaining condition is attained when the nozzle holder 2 is retained by the attachment 3 with the retaining pins 4a of the cover 4 being retained in the retaining recesses 2e. (see FIG. 2 with respect to the retaining condition)

As the plate 2f of the nozzle holder 2 is resiliently pressed against the lower end portion of the attachment 3, the nozzle holder 2 is disconnectably fixed to the attachment 3.

As explained above, in the present embodiment, the cover 4 can displace vertically for a predetermined amount relative to the attachment 3 so that the retaining pins 4a may be inserted from the respective introducing parts 2c of the nozzle holder 2 into the retaining recesses 2d. In addition, the urging member 5 pulls up the nozzle holder 2 by way of the retaining pins 4a to resiliently press the plate 2f of the nozzle holder 2 against the lower end portion of the attachment 3 and disconnectably fix the nozzle holder 2 to the attachment 3. Thus, the nozzle 1 is coupled and uncoupled by a simple (one-touch) operation and the operational efficiency of nozzle exchanging is much improved.

Still further, if four retaining pins 4a are arranged at the same interval to enable angular change by 90 degrees, an assembly can be made to cope with the arrangement of an electric part of a rectangular shape.

The above described embodiment is an illustration of an exemplary preferred concrete form of the present invention and the present invention is not limited to the form of the embodiment.

For example, the nozzles 1 and the nozzle holding portion 2a of the nozzle holder 2 may be modified in accordance with the shape of the surface mounted electric parts.

The embodiment described above employs a clamp mechanism wherein the pipe fixing means 6 is arranged such that the attachment 3 is fitted on the air pipe and the screw of the clamp provided on the pipe fixing means 6 is fastened. The pipe fixing means 6 is not necessarily composed of such a clamp mechanism, but variations and modifications are available, such as a method wherein, for example, a screw is provided on the side surface of the attachment 3 and the attachment 3 is fixed on the air pipe by fastening the screw, or another method wherein a male and female screws are respectively formed on the surfaces of the air pipe and the attachment that oppose each other, and the screws are threaded each other to fix the attachment to the air pipe.

The urging member 5 may not necessarily be of the spiral coil shape as shown in the Figures, but may be other type of urging mechanism such as a leaf spring of an appropriate shape, so far as the urging member can be mounted between the cover 4 and the attachment 3.

Further, the number of the slots 3b and retaining pins 4a is not necessarily four as shown in the Figures but may be more or less in accordance with the necessity of the change of angular position of the nozzle.

The embodiment may be varied and modified in various ways within the scope of the claimed invention.

UTILITY OF THE INVENTION IN THE INDUSTRY

According to the present invention as described above, a remarkable effect can be attained that, in a nozzle for hot air, operational efficiency is much improved in both exchange of the nozzle and the shifting of the angular position of the nozzle.

What is claimed is:

1. A disconnectable hot air nozzle adapted for hot air blowing type heating device to be used for removal of a surface mounted electric part, and adapted for being connected with hot air pipe, the hot air nozzle including:

a nozzle holder for holding a nozzle which is for blowing hot air;

a cylindrical attachment to be connected with the air pipe at its upper end portion;

a cylindrical cover provided to surround the attachment and connected to the attachment such that the cylindrical cover can not rotate relative to the attachment but can move vertically for a predetermined amount relative to the attachment; and a urging member provided between the attachment and the cover to urge the cover upward relative to the attachment;

the hot air nozzle is characterized by that said cover is provided with a retaining pin which projects radially;

that said nozzle holder has a cylindrical portion fittable to the lower part of the attachment, the cylindrical portion being provided with an introducing portion for introducing the retaining pin of the cover, and a hook shaped retaining portion for retaining the retaining pin;

that said attachment and nozzle holder are respectively provided with abutting portions vertically opposing each other;

that when said cylindrical portion of the nozzle holder is fitted to the lower portion of the attachment and said retaining pin is introduced by the introducing portion of the nozzle holder and retained at the retaining portion, the nozzle holder is disconnectably fixed to the attachment with said abutting portions being brought into resilient abutment with each other by the force applied from the urging member to the nozzle holder via the retaining pin.

2. A disconnectable hot air nozzle according to claim 1, characterized by that the cover has a structure to be connected with the attachment in the manner that it can not rotate but can move vertically for a predetermined amount relative to the attachment, and that said cover is provided with an elongated slot with an end of the retaining pin engaging the slot.

3. A disconnectable hot air nozzle according to claim 2, characterized by that a plurality of retaining pins are provided at a plurality of positions circumferentially of the cover, at predetermined intervals and that the introducing portion and retaining portion are provided at a plurality of positions corresponding to the retaining pins.

* * * * *